United States Patent [19]

Buckley

[11] 4,245,617
[45] Jan. 20, 1981

[54] VALVE

[75] Inventor: B. Shawn Buckley, Cambridge, Mass.

[73] Assignee: Chevron Research Company, San Francisco, Calif.

[21] Appl. No.: 6,767

[22] Filed: Jan. 26, 1979

Related U.S. Application Data

[63] Continuation-in-part of Ser. No. 465,377, Apr. 29, 1974, abandoned, and a continuation-in-part of Ser. No. 494,658, Aug. 9, 1974, abandoned, and a continuation-in-part of Ser. No. 588,093, Jun. 18, 1975, Pat. No. 4,137,964.

[51] Int. Cl.³ ............................................. F24J 3/02
[52] U.S. Cl. ............................ 126/434; 165/40; 165/106; 137/172; 137/564; 251/11
[58] Field of Search .................... 165/32, 106, 40; 126/434; 137/171, 172, 564, 154; 251/11

[56] References Cited

U.S. PATENT DOCUMENTS

| 1,900,715 | 3/1933 | Jaeger | 165/106 X |
| 3,220,470 | 11/1965 | Balch | 165/40 |
| 3,242,680 | 3/1966 | Boke | 165/106 X |
| 3,563,305 | 2/1971 | Hay | 165/106 X |

FOREIGN PATENT DOCUMENTS 121150  3/1946  Australia .................................. 137/564

Primary Examiner—Albert W. Davis
Attorney, Agent, or Firm—R. L. Freeland, Jr.; E. J. Keeling; R. H. Evans

[57] ABSTRACT

A unidirectional valve for use, e.g., in a thermosyphon solar heating system including a collector, a storage tank, and a liquid having a transfer portion in the collector and a storage portion in the tank, the valve comprising a partition, having a predetermined vertical extent, transversely separating the portions, the partition being transversely spaced such that the surface area of the transfer portion is much less than the surface area of the storage portion, whereby changes in the density of the transfer portion cause the surface thereof to travel vertically along the partition, permitting the transfer portion to flow around the end of the partition into the tank, but changes in the density of the storage portion cause only inconsequential movement of the surface thereof along the partition preventing flow of the storage portion around the end of the partition into the collector.

18 Claims, 8 Drawing Figures

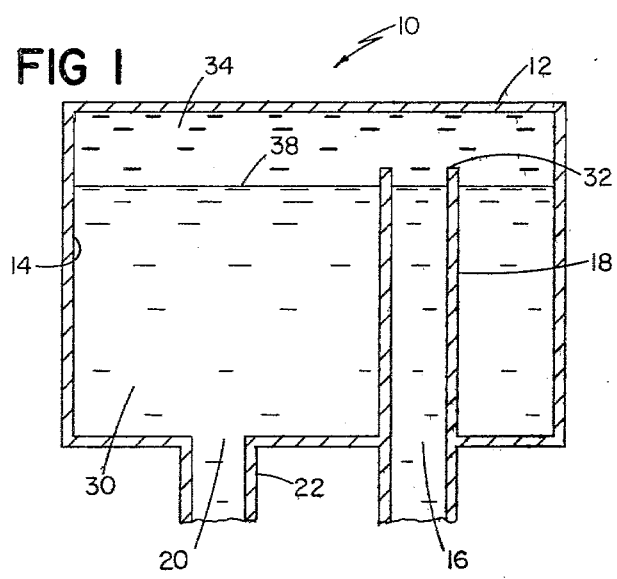
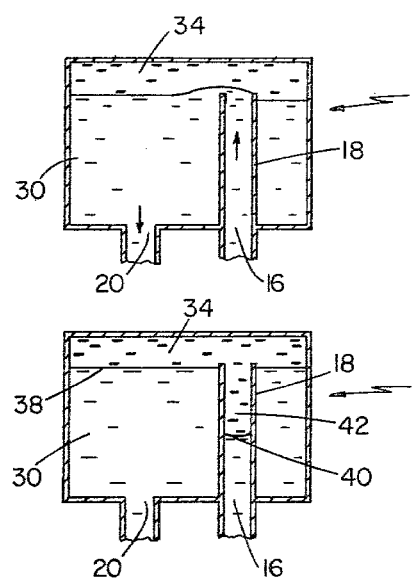
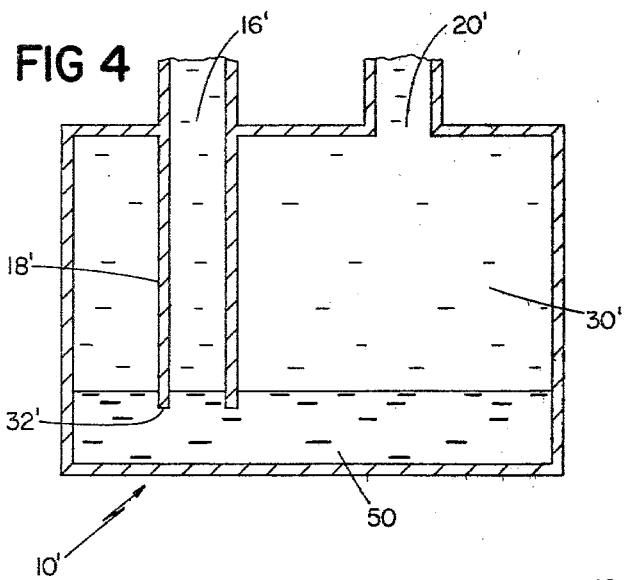
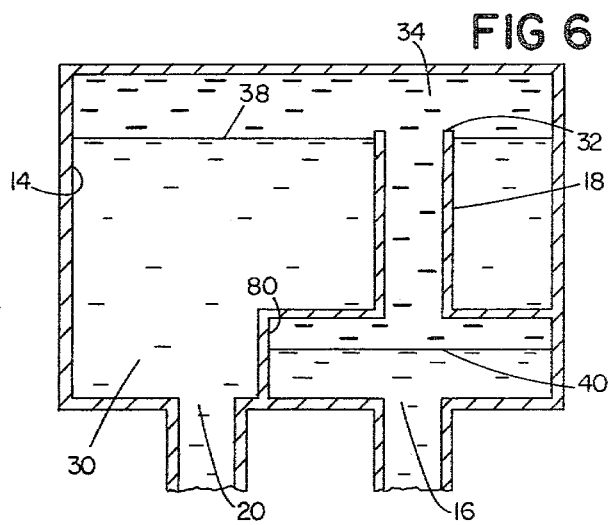
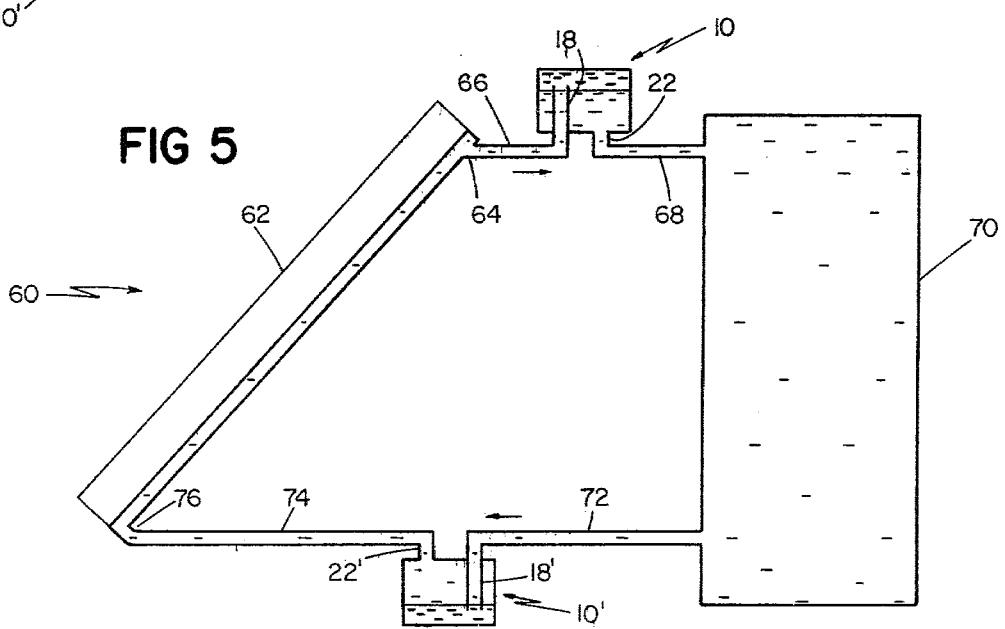

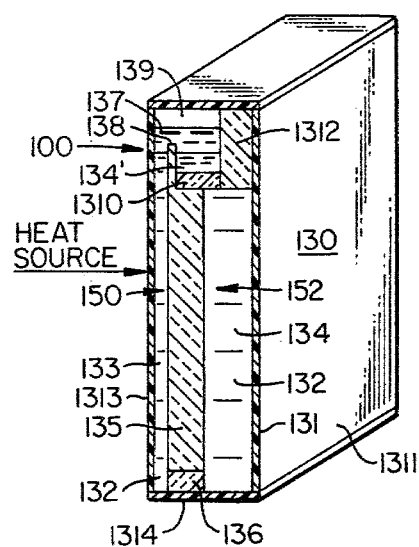
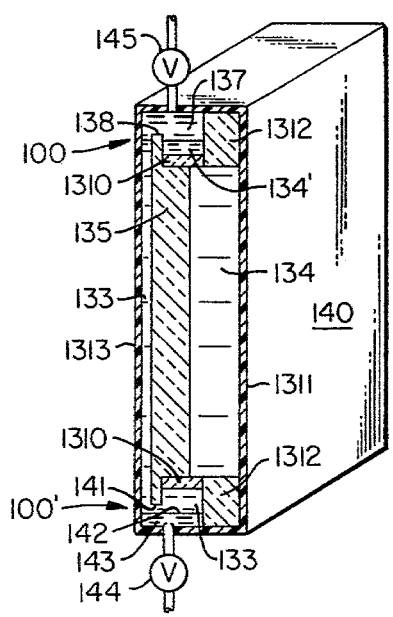

VALVE

CROSS-REFERENCE TO RELATED APPLICATIONS

This application is a continuation-in-part of my U.S. Pat. applications Ser. No. 465,377, filed Apr. 29, 1974 (now abandoned), Ser. No. 494,658, filed Aug. 9, 1974 (now abandoned), each Ser. No. 588,093, filed June 18, 1975 now U.S. Pat. No. 4,137,964, the benefit of which filing dates are herein claimed, and which I incorporate by reference herein.

FIELD OF THE INVENTION

This invention relates to valves, and in particular to a liquid valve for use in a thermosyphon solar heating system.

BACKGROUND OF THE INVENTION

A conventional method of heating hot water by solar energy is with a tank-over-collector thermosyphon system. A solar collector is located below a water storage tank. The collector is connected to the tank by pipes, one pipe connecting the top of the collector to the top of the tank and another pipe connecting the bottom of the collector to the bottom of the tank. During the day when solar radiation heats the water in the collector, the heated water rises because of its lower density, and enters the storage tank through the top pipe. The collector is replenished through the bottom pipe with cool water from the bottom of the tank. Thus, while the sun heats the collector, there is a thermosyphon circulation, with hot water continually flowing from collector to storage.

When the sun sets, the less dense heated water tends to remain at the top of the tank for use during the night, or even the following day. However, if the storage tank was not above the collector, at night a "reverse thermosyphon" circulation would occur. Solar-heated water in the storage tank would flow back into the collector where it would cool, and the cooled water would in turn flow back into the tank.

However, tank-over-collector systems, though not subject to reverse thermosyphon circulation, present a number of other problems. The tank is a heavy object, often weighing over 600 pounds. Building a structure strong enough to support the weight of the tank is expensive. In addition, such a structure is top-heavy and prone to topple in strong winds. Also, a solar collector is often less obstructed by trees if it is positioned on a roof, but positioning a storage tank higher than a collector on a roof is not only difficult, but lacks aesthetic appeal as well.

In contrast, a fairly compact unit can be built if the tank is not above the collector. For example, the tank can be positioned at same level as the collector in flat roof or ground installations, the tank providing a strong support member for the collector. But, as mentioned, such a system is very inefficient, because heat collected by day leaks away at night due to reverse thermosyphon circulation.

SUMMARY OF THE INVENTION

My invention provides a valve which permits a liquid to flow easily in one direction, but prevents the liquid from flowing in the opposite direction. My valve is readily incorporated into a thermosyphon solar heating system, in which the tank is not positioned above the collector, to prevent reverse thermosyphon circulation, while permitting forward circulation during heating. My valve is simple, easy to construct, and has no moving parts that are subject to wear, thereby providing reliably effective operation over a long life span.

In one aspect, the valve of my invention features, a housing having a chamber, a first liquid in the chamber, a second liquid in the chamber having a different density than the first liquid and being immiscible therewith, the first and second liquids being bounded on a common side by an interface, an outlet in the housing communicating with the first liquid, a conduit in the housing passing through the first liquid and the interface, and having one end extending into the second liquid, the interface having an area much greater than the cross-sectional area of the conduit, and an inlet in the housing communicating with the second liquid through the other end of the conduit. When the pressure at the inlet exceeds the pressure at the outlet by a predetermined amount, the first liquid flows from the conduit, by the second liquid, and out the outlet, but when the pressure at the outlet exceeds the pressure at the inlet, the first liquid forces a portion of the second liquid into the conduit, the portion balancing the excess outlet pressure and preventing flow of the first liquid from the outlet to the inlet.

In preferred embodiments, the second liquid is less dense than the first liquid and floats on the first liquid, and the conduit extends upwardly through the first liquid into the second liquid; the first liquid is water, and the second liquid is silicone oil, mineral oil, or castor oil; the first liquid is less dense than the second liquid and floats on the second liquid, and the conduit extends downwardly through the first liquid into the second liquid; the first liquid is water, and the second liquid is either mercury or an organic liquid; a catch chamber is positioned in the conduit adjacent the inlet to capture the second liquid; and the catch chamber has a volume at least as great as the volume of the second liquid contained between the interface and the plane parallel to the interface and passing through the end of the conduit.

In another aspect, my invention features a unidirectional liquid valve for use in a thermosyphon solar heating system having a collector and a storage tank, the valve comprising a first liquid having a transfer portion in the collector and a storage portion in the tank, and a second liquid having a different density than the first liquid and being immiscible therewith, the second liquid being positioned between the transfer and storage portions and separated therefrom by interfaces, the interface between the second liquid and the storage portion being greater in area than the interface between the second liquid and the transfer portion.

In preferred embodiments, the second liquid is less dense than the first liquid and floats on each of the portions of the first liquid; the first liquid is water, and the second liquid is either silicone oil, mineral oil, or castor oil; the first liquid is less dense than the second liquid, and both portions of the first liquid float on the second liquid; the first liquid in water, and the second liquid is either mercury or an organic liquid; and the portions are separated transversely by a thermal insulator, the insulator passing through said interfaces and extending into the second liquid.

In yet another aspect, my invention features a unidirectional valve for use in a thermosyphon solar heating system including a collector, a storage tank, and a liquid having a transfer portion in the collector and a storage portion in the tank, the valve comprising a partition, having a predetermined vertical extent, transversely separating the portions, the partition being transversely spaced such that the surface area of the transfer portion is much less than the surface area of the storage portion. Changes in the density of the transfer portion cause the surface thereof to travel vertically along the partition, permitting the transfer portion to flow around the end of the partition into the tank, but changes in the density of said storage portion cause only inconsequential movement of its surface along the partition, preventing flow of the storage portion around the end of the partition into the collector.

In preferred embodiments, the valve has a control liquid vertically extending from the surface of each of the portions to a distance beyond the end of the partition, the control liquid having a different density than the liquid and being immiscible therewith.

PREFERRED EMBODIMENTS

I turn now to the structure and operation of preferred embodiments of my invention, after first briefly describing the drawings.

DRAWINGS

FIG. 1 is a cross-sectional side elevation, somewhat schematic, showing one preferred embodiment of the valve of the invention.

FIGS. 2 and 3 show the valve of FIG. 1 in different stages of operation.

FIG. 4 is a cross-sectional side elevation, somewhat schematic, showing another preferred embodiment of the valve of the invention.

FIG. 5 is a cross-sectional side elevation, somewhat schematic, showing the valves of FIGS. 1 and 4 in a thermosyphon solar heater.

FIG. 6 is a cross-sectional side elevation, somewhat schematic, showing the most preferred embodiment of the invention.

FIG. 7 is a cross-sectional perspective view, somewhat schematic, of another preferred embodiment of the valve of the invention, shown in a convection solar panel.

FIG. 8 is a cross-sectional side perspective view, somewhat schematic, showing the valve of FIG. 7 and another preferred embodiment of the valve of the invention in a convection solar panel.

STRUCTURE AND OPERATION

There is shown in FIG. 1 a valve 10 having a housing 12, and a chamber 14 within the housing. Inlet port 16 communicates with chamber 14 through conduit 18, and outlet port 20 communicates with chamber 14 through pipe 22. The lower portion of chamber 14 is filled with a low viscosity liquid 30, e.g., water, to just below the top 32 of conduit 18. The remaining portion of the chamber 14 is filled with a second, less dense liquid 34, which is immiscible with liquid 30, usually a low density oil (e.g., silicone oil, mineral oil, castor oil), which floats on water 30. The area of oil-water interface 38 is much greater than the cross-sectional area of conduit 18.

FIG. 2 shows the operation of valve 10 when the pressure at inlet 16 is higher than the pressure at outlet 20. Water 30 flows up conduit 18, tunnels under oil 34, and exits through outlet 20.

Conversely, FIG. 3 shows the operation of valve 10 when the pressure at outlet 20 is greater than the pressure at inlet 16. Oil 34 is drawn down into riser 18. When the depth of interface 40 is far enough below interface 38, the column 42 of low density oil 34, being forced beneath the surface of the higher density water 30, balances the differential pressure applied between outlet 20 and inlet 16; flow ceases, thus preventing water from flowing from outlet 20 to inlet 16.

Another embodiment of the valve of the invention is shown in FIG. 4. Conduit 18' of valve 10' extends downwardly through water 30' into a liquid 50 that is denser than water (e.g., mercury, organic liquids immiscible with water). When the pressure at inlet 16' is greater than the pressure at outlet 20', the less dense water 30' will push aside the liquid 50 about the end 32' of conduit 18', and water will flow from inlet 16' to outlet 20'.

In general, the sensitivity of each of the valves 10 and 10' depends on the difference in the densities between the liquids in its chamber. When the density difference is small, the valve becomes very sensitive to pressure differentials applied between the inlet and the outlet. That is, a very slight pressure is required to cause flow from the inlet to the outlet. For example, in a typical valve 10 (FIG. 1) if oil 34 is mineral oil (specific gravity 0.88), water 30 would flow over top 32 of riser 18 at a pressure differential between inlet 16 and outlet 20 on the order of 0.001 psi. However, if oil 34 is castor oil (specific gravity 0.96), the valve would be approximately three times as sensitive as the water-mineral oil valve, requiring a pressure differential on the order of only 0.0003 psi to initiate flow between inlet 16 and outlet 20.

FIG. 5 shows schematically how valves 10 and 10' are installed in a thermosyphon solar water heater 60. A solar collector 62, designed for thermosyphon action, is connected at its top manifold 64 by pipe 66 to the conduit 18 of valve 10. Pipe 22 of valve 10 is connected by pipe 68 to the top of storage tank 70. The bottom of storage tank 70 is connected by pipe 72 to the conduit 18' of valve 10'. Pipe 22' is connected by pipe 74 to bottom manifold 76 of collector 62. Both valves 10 and 10' need not be installed in the thermosyphon loop; either valve is sufficient to give the one-way action required.

Turning now to FIG. 6, there is shown the most preferred embodiment of the valve of the invention, which includes a catch chamber 80. Occasionally, the pressure at the outlet 20 of a valve 10 (FIG. 3) is so great that interface 40 moves down conduit 18 and out of the valve. Catch chamber 80 captures any oil 34 which is forced too far down conduit 18. Catch chamber 80 is designed to hold at least the volume of oil 34 that is below the top 32 of conduit 18 in main chamber 14 when no pressure differential exists between inlet 16 and outlet 20 (FIG. 1). As the pressure differential between the inlet and the outlet becomes greater, more oil 34 is caught in the catch chamber 80. Eventually, though, the interface 38 will rise above the top 32 of conduit 18, and water 30 will pour down conduit 18, through the oil 34 captured in chamber 80, and out valve 10. Although this situation is not advantageous in storing solar-heated water (the reverse flow causing heat to be lost), it is better than losing oil 34 completely from main chamber 14. When the pressure differential between inlet 16 and outlet 20 reverses, the oil 34 captured in chamber 80 is forced back into main chamber 14 through conduit 18. Normal operation can then resume without loss of any of the oil 34 from valve 10. Of course, a similar catch chamber could be provided in valve 10' (FIG. 4).

Turning now to FIG. 7, another embodiment of the invention, valve 100, is in a thermal panel 130 having a collector zone 150 and a storage tank zone 152. The thermal panel 130 comprises a container 131 for a low viscosity liquid 132 which is suitable for convective heat transfer. Water is a suitable liquid. The liquid 132 is divided into two portions, a transfer portion 133, and a storage portion 134, by a partition in the form of thermal insulator 135, typically a closed cell foam, which extends to the side walls (not shown) of panel 130. When the temperature of the two portions 133, 134 of the liquid 132 are the same, their heights in the panel are the same as shown in FIG. 7. If the temperature of liquid 133 is increased while that of liquid 134 is unchanged, the density of liquid 133 decreases and its height increases until it rises above the top 138 of the insulator 135 and spills over into portion 134 of the liquid thereby transferring part of the heat of liquid 133 to liquid 134. Open cell foam insulation 136, a permeable insulator at the bottom of the insulator 135 completes the convection path from colder liquid 134 to heated liquid 133. The open cell foam insulation 136 allows convective heat transfer between liquid 134 to liquid 133 by allowing liquid flow through the foam. When no liquid is flowing through the open cell foam, the foam acts like an insulator since heat transfer occurs mostly by conduction rather than by convection. A long serpentine passage through the bottom of the closed cell foam 135 would serve the same purpose as the open cell foam 136. The open cell insulation 1310 near the top of insulator 135 provides the same insulating function as insulation 136.

The difference in the height of liquid 133 compared to the height of liquid 134 for a given temperature difference between liquid 133 and liquid 134 may be designated the sensitivity. The sensitivity of the thermic panel 130 may be increased by floating a second liquid 137, a control liquid, on the surface of the heat transferring liquid 132 thereby providing liquid valve means. The liquid 137 should have a density less than but close to that of the liquid 132 for high sensitivity and be immiscible in liquid 132. Oil, which has a density of about 0.9 that of water is a suitable liquid 137 when liquid 132 is water. The liquid 137 should extend above the topmost portion 138 of insulator 135 for maximum increase in sensitivity. The top of the liquid 137 may be open to the atmosphere or may as in FIG. 7 have an air chamber 139 between it and the closed top of panel 130 to absorb the pressure change caused by the changing volume of liquid 132 with temperature changes. Alternatively, air chamber 139 may be omitted if panel 130 is capable of withstanding the volume changes by distorting the sides 1311 of the panel 130. Also the air chamber 139 can be replaced by an internal bellows (not shown) filled with air.

If, when both liquids 133 and 134 are at the same temperature, the height of the liquids is h, the sensitivity expressed as a dimensionless change in height for the liquid 133 is given by the following equation:

$$\frac{\Delta h}{h} = \frac{\rho_2 - \rho_1}{\rho_1 + \frac{A_1}{A_2}\rho_2 - (1 + \frac{A_1}{A_2})\rho_3}$$

where $\rho_1$, $\rho_2$ and $\rho_3$ are the densities of the liquids 133, 134 and 137, respectively, (density changes with temperature) and $A_1/A_2$ is the ratio of surface areas of the liquids 133 and 134.

The unidirectionality of heat flow from liquid 133 to liquid 134 for a relative increase in temperature of liquid 133 with respect to liquid 134 is accomplished by causing the surface area of the top of liquid 134 to be much greater than that of liquid 133. For this arrangement, the change in height of liquid 133 by an amount $\Delta n$ will be accompanied by a lesser change in height of liquid 134 by the ratio of the surface areas. Thus, the level of the liquid 134 is relatively constant with changes in temperature of liquid 133. The temperature increase of liquid 134 which will cause it to transfer heat energy to liquid 133 by flowing over the top 138 of insulator 135 will be greater by a factor of the ratio of the surface areas than the temperature increase which will cause liquid 133 to flow over top 138.

The closed cell from insulation 1312 at the top of the panel 130 reduces the conductive heat transfer between the liquid 134' on the top of insulation 1310 and the remainder of liquid 134. In the panel 130 illustration in cross section in FIG. 7, the liquid 134 is shown having a much greater volume than that of liquid 133. This form of construction is useful for a solar energy application where the smaller volume of liquid 133 is exposed to and collects solar energy, is heated thereby to a temperature high enough to change its density and cause it to flow over insulator top 138, and thereby heat the large storage reservoir of liquid 134. Of course, if no heat storage is desired, the volume of liquid 134 could be reduced to a small amount by reducing the width of the liquid 134 region to an extent where insulator 1312 would no longer be required and wall 1311 would be contiguous with open cell insulator 1310.

The side surfaces 1311, 1313 of panel 130 are either heat conductive or radiative or both transmissive depending upon the manner of heating or cooling the liquids 133 and 134. The top 1312 and bottom 1314 are preferably thermally nonconductive as are the sides of the container 131 forming the exterior of panel 130.

When temperature of the liquid 133 is greater than that of liquid 134, heat is readily convected from liquid 133 to liquid 134; when temperature of liquid 133 is less than liquid 134, little heat is convected from liquid 134 to liquid 133. This unidirectional heat flow provides a diode action.

The isolating structure or panel 130 in FIG. 7 is vertically oriented, but it need not be: it is necessary, however, that there be a vertical component or orientation for appropriate convection to occur. In other words, the isolating structure 130 can be disposed at an angle such as might occur, for example, if such structure forms an inclined roof of a house or the like. In any event, the internal thermal insulator is impenetrable (i.e., closed cell) to the liquid at intermediate portions thereof, or at all portions thereof except its top or upper portion and its bottom or lower portion as is discussed above; hence the panel 130 is divided into a first section containing the liquid 134 and a second section containing the liquid 133. Further the upper portion or the lower portion (or both) is selectively permeable to the flow of liquid. This can be done by providing the open cell insulator 136 (which is merely a porous or permeable extension of the insulator 135) at the lower portion of the structure 130 and the liquid valve arrangement above described at the upper portion of the structure 130, the liquid valve thereby rendering said upper portion selective in permitting liquid to pass through said upper portion in convective flow between the first section and the second section of the isolating structure 130. It will be appreciated that the various porous insulators mentioned above and hereinafter at the upper end and lower end of the insulator 135 (or modifications thereof) can be considered as merely open cell extensions of the impenetrable intermediate or central portion of the insulator 135.

The cross-sectional view of panel 140 in FIG. 8 illustrates the manner in which the panel of FIG. 7 may be modified to be a winter-summer panel. The panel is mounted so that surface 1313 is on the outside of a building, whereas surface 1311 is on the inside of the building. In operation of the panel in the winter, the outside surface 1313 faces the sun, so that the liquid 133 behind it absorbs the radiant energy of the sun. When the temperature of liquid 133 exceeds the temperature of the liquid 134 facing the interior of the house by an amount determined by the specific design parameters of the panel, the liquid 133 will convectively flow over the top 138 of insulation 135 to thereby heat liquid 134. The panel will operate in the manner described in detail in the description of FIG. 7 if the liquid 133, 134 (when at the same temperature) is below the insulator top 138 and an immiscible liquid 137 of less density than liquid 133, 134 is above the top 138. The bottom 141 of insulation 135 is preferably above the top 142 of liquid 143, in which case there is no effect produced by the viscosity of liquid 143, which is denser than and immiscible with liquid 133, 134.

The panel 140 may also be used in the summer in a mode where liquid 133 is cooled by radiation and/or convection cooling to a night sky. If the temperature of liquid 133 is thus cooled to a temperature less than that of liquid 134 on the interior of the house, it is desired that there be convection flow of the liquid 133, 134. For panel 140 to accomplish this, it is necessary to raise the level of liquid 143 so that it is higher than the bottom 141 of insulator 135. Valve 144 can be used to control the flow of liquid 143 from a suitable liquid source. Valve 145 is opened to drain liquid 137 out of panel 140 until the top 138 of insulator 135 is covered by liquid 133. Each winter and summer season, the panel 140 is converted to change its direction of heat flow by controlling valves 144 and 145 to drain and fill the panel 140 with the liquids 137 and 143 to get their correct levels for the desired direction of heat flow.

Other embodiments of the invention will occur to those skilled in the art and are within the following claims.

What is claimed is:
1. A liquid valve comprising:
a housing having a chamber therein,
a first liquid in said chamber,
a second liquid in said chamber having a different density than said first liquid and being immiscible therewith,
said first and second liquids being bounded on a common side by an interface therebetween,
an outlet in said housing communicating with said first liquid,
a conduit in said housing passing through said first liquid and said interface, and having one end thereof extending into said second liquid,
said interface having an area much greater than the cross-sectional area of said conduit, and
an inlet in said housing communicating with said second liquid through the other end of said conduit,
whereby when the pressure at said inlet exceeds the pressure at said outlet by a predetermined amount, said first liquid flows from said conduit, by said second liquid, and out said outlet, but when the pressure at said outlet exceeds the pressure at said inlet, said first liquid forces a portion of said second liquid into said conduit, said portion balancing said excess outlet pressure and preventing flow of said first liquid from said outlet to said inlet.

2. The valve of claim 1 wherein,
said second liquid is less dense than said first liquid and floats on said first liquid, and
said conduit extends upwardly through said first liquid into said second liquid.

3. The valve of claim 2 wherein,
said first liquid is either water or water with additives, and
said second liquid is oil.

4. The valve of claim 3 wherein said second liquid is either silicone oil, mineral oil, or castor oil.

5. The valve of claim 1 wherein,
said first liquid is less dense than said second liquid and floats on said second liquid, and
said conduit extends downwardly through said first liquid into said second liquid.

6. The valve of claim 5 wherein,
said first liquid is water, and
said second liquid is either mercury or an organic liquid.

7. The valve of claim 1 further comprising,
a catch chamber positioned in said conduit to capture said second liquid.

8. The valve of claim 7 wherein said catch member is adjacent said inlet.

9. The valve of claim 7 or 8 wherein said catch chamber has a volume at least as great as the volume of said second liquid contained between said interface and the plane parallel to said interface and passing through said one end of said conduit.

10. A unidirectional liquid valve for use in a thermosyphon solar heating system having a collector and a storage tank, said valve comprising,
a first liquid having a transfer portion in said collector and a storage portion in said tank, and
a second liquid having a different density than said first liquid and being immiscible therewith,
said second liquid being positioned between said transfer and storage portions and separated therefrom by interfaces,
said interface between said second liquid and said storage portion being greater in area than said interface between said second liquid and said transfer portion.

11. The valve of claim 10 wherein said second liquid is less dense than said first liquid and floats on each of said portions of said first liquid.

12. The valve of claim 11 wherein,
said first liquid is water, and
said second liquid is oil.

13. The valve of claim 12 wherein said second liquid is either silicone oil, mineral oil, or castor oil.

14. The valve of claim 10 wherein said first liquid is less dense than said second liquid and both portions of said first liquid floats on said second liquid.

15. The valve of claim 14 wherein, said first liquid is water, and said second liquid is either mercury or an organic liquid.

16. The valve of claim 11 or 14 wherein said portions are separated transversely by a thermal insulator, said insulator passing through said interfaces and extending into said second liquid.

17. A unidirectional valve for use in a thermosyphon solar heating system including a collector, a storage tank, and a liquid having a transfer portion in said collector and a storage portion in said tank, said valve comprising, a partition having a predetermined vertical extent transversely separating said portions, said partition being transversely spaced such that the surface area of said transfer portion is much less than the surface area of said storage portion, whereby changes in the density of said transfer portion cause the surface thereof to travel vertically along said partition, permitting said transfer portion to flow around the end of said partition into said tank, but changes in the density of said storage portion cause only inconsequential movement of the surface thereof along said partition preventing flow of said storage portion around the end of said partition into said collector.

18. The valve of claim 17 further comprising, a control liquid vertically extending from the surface of each of said portions to a distance beyond the end of said partition, said control liquid having a different density than said liquid and being immiscible therewith.

* * * * *